(12) United States Patent
Kellgren et al.

(10) Patent No.: US 6,677,786 B2
(45) Date of Patent: Jan. 13, 2004

(54) MULTI-SERVICE PROCESSOR CLOCKING SYSTEM

(75) Inventors: Tore L. Kellgren, San Jose, CA (US); George Apostol, Jr., Santa Clara, CA (US); Harsimran S. Grewal, Los Gatos, CA (US)

(73) Assignee: Brecis Communications Corporation, San Jose, CA (US)

( * ) Notice: Subject to any disclaimer, the term of this patent is extended or adjusted under 35 U.S.C. 154(b) by 0 days.

(21) Appl. No.: 10/086,500

(22) Filed: Feb. 28, 2002

(65) Prior Publication Data

US 2003/0042506 A1 Mar. 6, 2003

(Under 37 CFR 1.47)

Related U.S. Application Data

(60) Provisional application No. 60/272,490, filed on Feb. 28, 2001.

(51) Int. Cl.[7] ................................................ H03B 19/00
(52) U.S. Cl. .......................................... 327/116; 327/47
(58) Field of Search ................................. 327/116, 119, 327/237, 47, 48

(56) References Cited

U.S. PATENT DOCUMENTS 5,371,765 A * 12/1994 Guilford ..................... 375/373
5,941,940 A * 8/1999 Prasad et al. ............... 708/523
5,987,490 A * 11/1999 Alidina et al. .............. 708/523

* cited by examiner

Primary Examiner—Timothy P. Callahan
Assistant Examiner—Linh Nguyen
(74) Attorney, Agent, or Firm—Schwabe, Williamson & Wyatt, PC

(57) ABSTRACT

A frequency rate multiplier to produce an output with an output frequency as a ratio of an input frequency is described. In one embodiment, the frequency rate multiplier includes an accumulator register to store, based upon a first clock signal having the input frequency, a binary representation of the ratio having a first most significant bit and a second most significant bit, a first adder coupled to the accumulator register in a feedback arrangement to receive the binary representation stored in the accumulator register and, based upon the first clock signal, to repeatedly add the accumulator value to a programmable parameter value representing a component of the output frequency to obtain a first result, a secondary adder coupled between the first adder and the accumulator register to receive the first result and, based upon the second most significant bit, to add a constant value to the first result forming a second result to be stored into the accumulator register.

35 Claims, 10 Drawing Sheets

MULTI-SERVICE PROCESSOR CLOCKING SYSTEM

RELATED APPLICATION

This application claims priority to U.S. Provisional Application No. 60/272,490, entitled "MULTI-SERVICE PROCESSOR CLOCKING SYSTEM", filed Feb. 28, 2001, the specification of which is hereby fully incorporated by reference.

BACKGROUND OF THE INVENTION

1. Field of the Invention

The present invention relates to the field of integrated circuits (IC). More specifically, the present invention relates to the generation of clock signals for subsystems on an integrated circuit device.

2. Background Information

Advances in integrated circuit technology have led to the birth and proliferation of a wide variety of integrated circuits, including but not limited to application specific integrated circuits, micro-controllers, digital signal processors, general purpose microprocessors, and network processors. Recent advances have also led to the birth of what's known as "system on a chip" or SOC. Typically, a SOC includes multiple "tightly coupled" subsystems performing very different functions.

Often such subsystems will need to operate asynchronously involving different clock domains. Commonly, the individual subsystems will change operating frequencies depending upon the function the particular sub system is performing. Typically, prior art subsystems have utilized an analog phase locked loop (PLL) to generate the appropriate operating clock frequency based upon an input reference frequency (e.g. provided by the SOC). The outputs of such analog PLLs are usually adjusted by tuning the capacitance on an oscillator to modify the output frequency one way or another. Unfortunately however, analog PLLs do not provide the necessary precision to match the multiplicity of tightly tuned frequency rates required by the subsystems on modern high-speed SOC. Accordingly, over time, frequency drifts result in overruns or packet losses simply due to the rate differentials. The problem is further compounded for the future generations of SOC, where increasing number of subsystems operating in different timing domains have to be integrated on a single IC.

Output from PLLs may also be adjusted using an external divider circuit. However, given an input frequency, conventional dividers do not provide a wide enough range of output frequencies typically necessary for subsystems of an SOC.

Accordingly a need exists to at least partially address these problems to further advance the future generation of SOC.

BRIEF DESCRIPTION OF DRAWINGS

The present invention will be described by way of exemplary embodiments, but not limitations, illustrated in the accompanying drawings in which like references denote similar elements, and in which.

DETAILED DESCRIPTION OF THE INVENTION

The present invention includes clock generation logic to dynamically generate a variety of programmable operating frequencies for use by subsystems of a SOC. In the following description, various features and arrangements will be described, to provide a thorough understanding of the present invention. However, the present invention may be practiced without some of the specific details or with alternate features/arrangement. In other instances, well-known features are omitted or simplified in order not to obscure the present invention.

The description to follow repeatedly uses the phrase "in one embodiment", which ordinarily does not refer to the same embodiment, although it may. The terms "comprising", "having", "including" and the like, as used in the present application, including in the claims, are synonymous.

OVERVIEW

Figure 1:
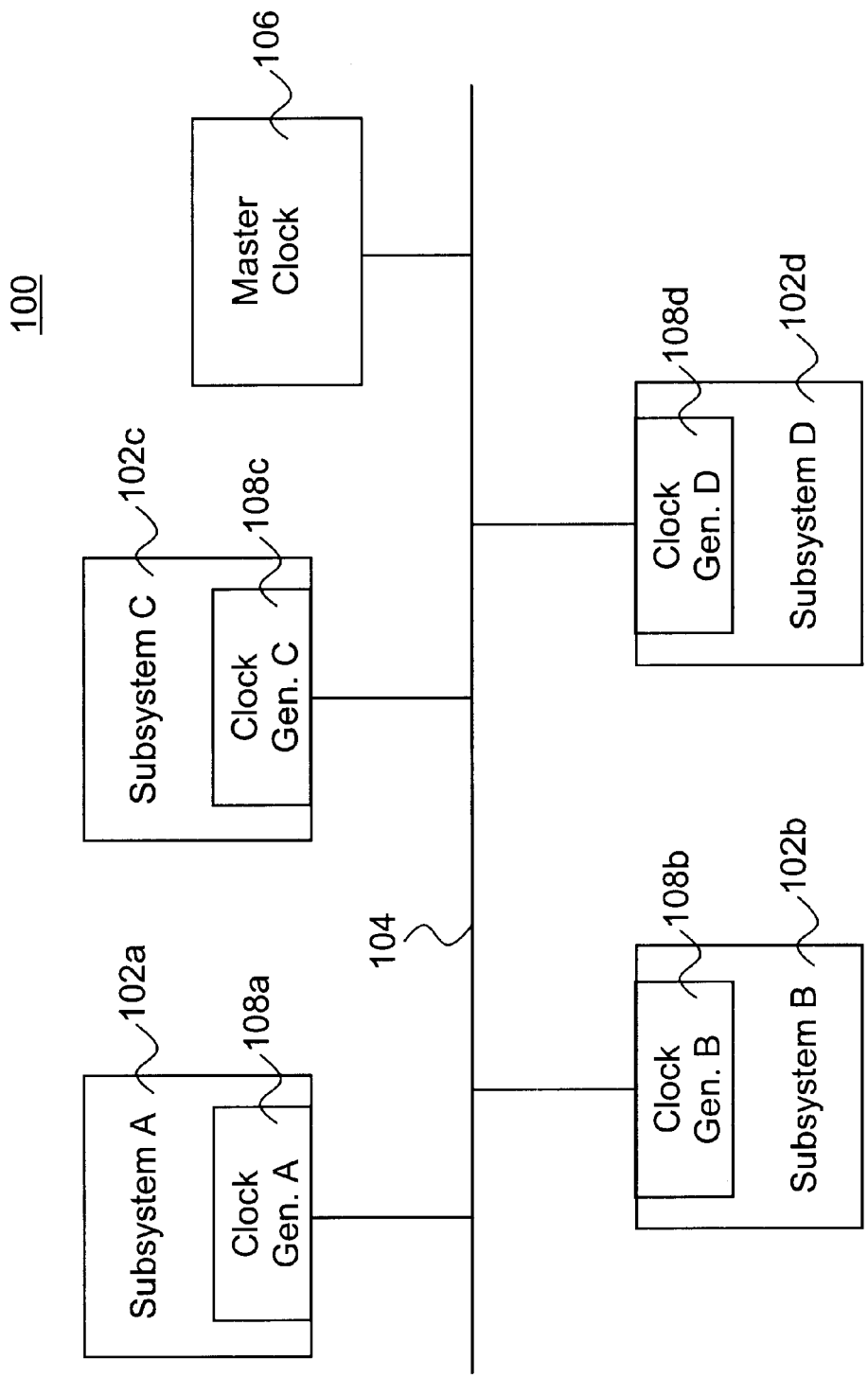
FIG. 1 illustrates an overview of a system on-chip (SOC) including an on-chip bus and a number of subsystems including a clock generation subsystem coupled to the on-chip bus, in accordance with one embodiment.

Referring now to FIG. 1, wherein a block diagram illustrating an overview of a SOC 100 including subsystems 102a–102d incorporated with the teachings of the present invention, in accordance with one embodiment, are shown. In the illustrated embodiment, SOC 100 includes on-chip bus 104, master clock 106, and subsystems 102a–102d coupled to each other through bus 104. In one embodiment, on-chip bus 104 represents an asynchronous packet-switched bus that facilitates communication between essentially autonomous subsystems 102a–102d. Moreover, each of subsystems 102a–102d includes clock generation logic 108a–108d, incorporated with teachings of the present invention, to generate a wide range of programmable clock frequencies for use by corresponding subsystems 102a–102d to handle a wide range of functions, while reducing glitches and skews often accompanying clock signals within SOCs. More specifically, as will be described in more detail below, in one embodiment clock generation logic 108a–108d of respective subsystems 102a–102d is advantageously provided with an adaptive and a locking frequency control mechanism to generate a wide range of programmable clock frequencies to facilitate flexible, high resolution rate matching by subsystems 102a–102d within SOC 100. In one embodiment, one or more of clock generation logic 108a–108d utilize a digital differential analyzer to generate an output clock frequency based upon master clock 106.

SOC 100 is intended to represent a broad range of SOCs, including multi-service ASICs. In particular, in various embodiments, subsystems 102a–102d may be one or more of a memory controller, a security engine, a voice processor, a collection of peripheral device controllers, a framer processor, and a network media access controller. In one embodiment, one or more subsystems 102a–102d may be multi-function subsystems. Except for the teachings of the present invention, the exact constitution and the exact manner their core logic operate in providing the functions/services the subsystems are immaterial to the present invention. While for ease of understanding, SOC 100 is illustrated as having only four subsystems 102a–102d, in practice, SOC 100 may have more or less subsystems.

Figure 2:
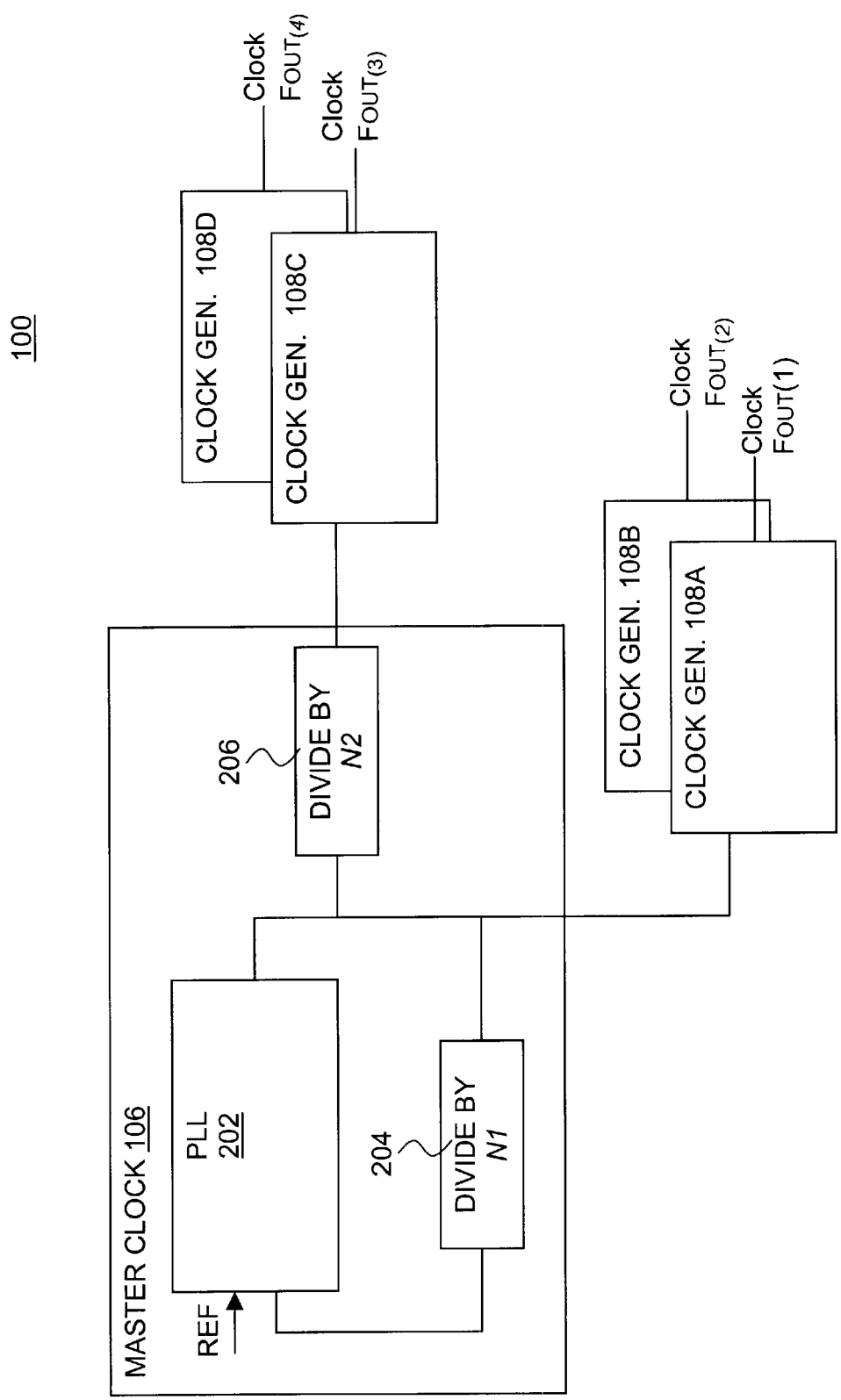
FIG. 2 illustrates a more detailed view of SOC 100 including clock generation logic in accordance with one embodiment of the present invention.

FIG. 2 illustrates a more detailed view of SOC 100 including clock generation logic 108a–108d in accordance with one embodiment of the present invention. As shown, SOC 100 includes master clock 106 and clock generation logic 108a–108d coupled together as shown. Master clock 106 includes a reference clock signal generated e.g. from a crystal oscillator, which is subsequently multiplied to a suitable master clock frequency via PLL 202 and programmable feedback divider 204. In one embodiment the reference clock signal oscillates at or about 20 MHz, which output is then multiplied to a master clock frequency in the range of about 300–400 MHz, but may easily be adjusted based upon the capabilities and/or design constraints provided/imposed by SOC 100. In one embodiment, the resulting master clock frequency is utilized as an input reference signal by clock generation logic 108a–108d of the present invention to generate a wide range of programmable output frequencies. In the illustrated embodiment, the master clock signal is passed through prescaler 206 before being passed to clock generation logic 108c–108d in accordance with needs and functionality of corresponding subsystems 102c–102d. This provides additional flexibility for shaping the input clock to one or more subsystems.

Figure 3A:
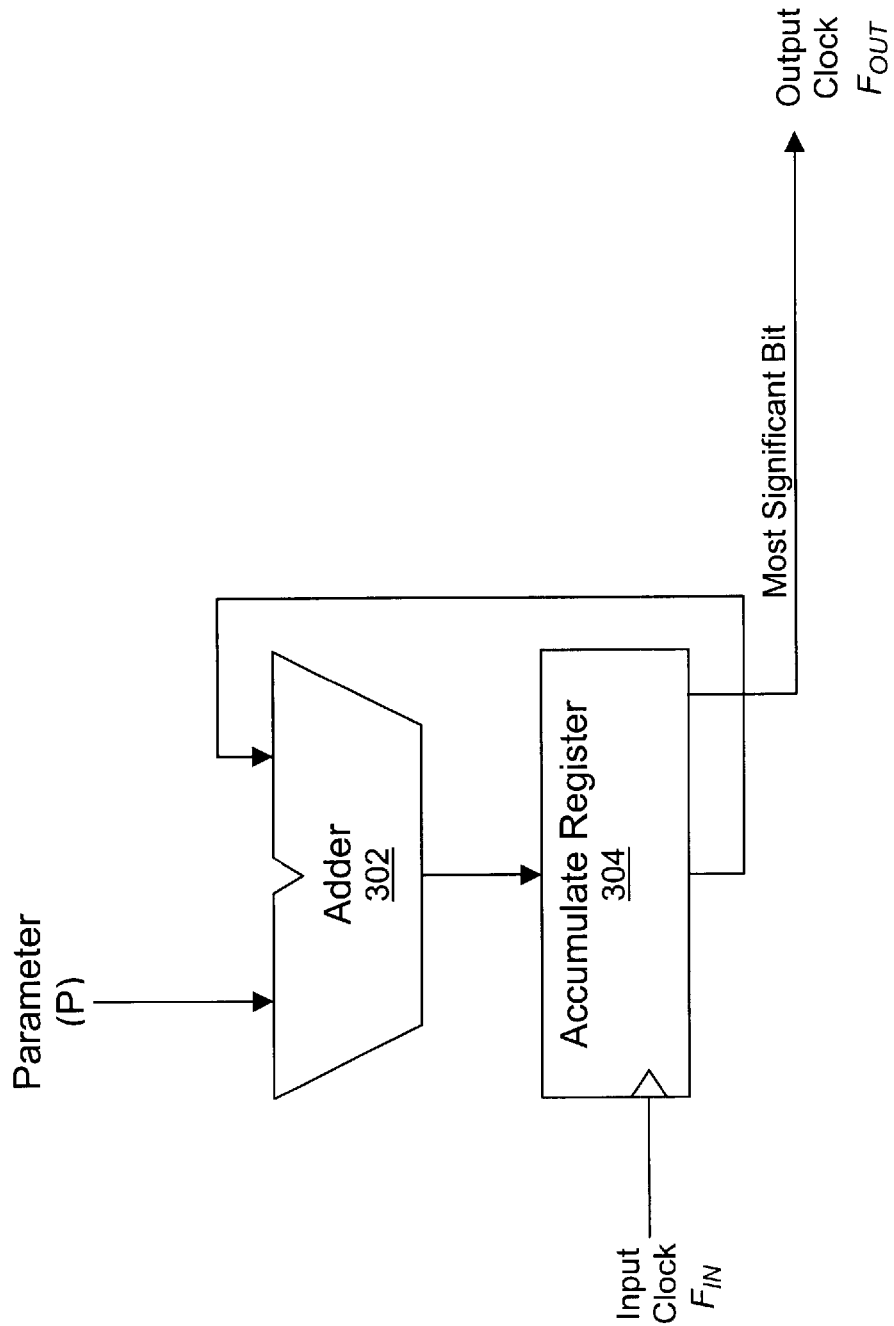
FIG. 3A illustrates a digital differential analyzer (DDA) based rate multiplier for use in the clock generation logic of the present invention, in accordance with one embodiment.

FIG. 3A illustrates a digital differential analyzer (DDA) based rate multiplier for use in the clock generation logic of the present invention, in accordance with one embodiment. DDA 300 includes adder 302 and accumulator register 304 advantageously coupled together as shown. Adder 302 receives an input parameter, which is repeatedly added into accumulator register 304 based upon the frequency $F_{IN}$ of the input clock signal. The most significant bit (MSB) of accumulator register 304 is used to drive the output of the DDA. The MSB drives output at an output frequency $F_{OUT}$ that is proportional to $F_{IN}$, parameter P, and the bit length (N) of accumulator register 304 as shown by the following relationship:

$$F_{OUT} = F_{IN} \times \frac{P}{2^N}$$

For example, if in the illustrated example the input clock frequency $F_{IN}$ is 400 MHz, accumulator register 304 is an 8-bit register (i.e. $2^N=256$), and P is 80, the resulting output frequency $F_{OUT}$ would be 125 MHz. With accumulator register 304 being an 8-bit register, $F_{OUT}$ can range in values from $F_{IN}/2$ to $F_{IN}/128$ (400 MHz–3.125 MHz) in discrete increments of 3.125 MHz, depending upon the value taken on by P. In accordance with the teachings of the present invention, if the size of accumulator register 304 is increased, the precision at which DDA 300 operates will correspondingly increase.

For example, if accumulator register 304 represents a 32-bit register and $F_{IN}$ remains at 400 MHz, $F_{OUT}$ could range in values from $F_{IN}/2$ to $F_{IN}/2,147,438,648$ depending upon the value of P. For the operating range of interest, this would result in a resolution of approximately 1 in 2 Billion or better than 0.1 part per million (PPM). However, it should be noted that as the size of accumulator register 304 increases, the size of adder 302 will have to increase to handle the addition of the larger numbers. Thus, the size of accumulator register 304 should not be chosen to be so large that adder 302 can not run at the selected input frequency.

Figure 3B:
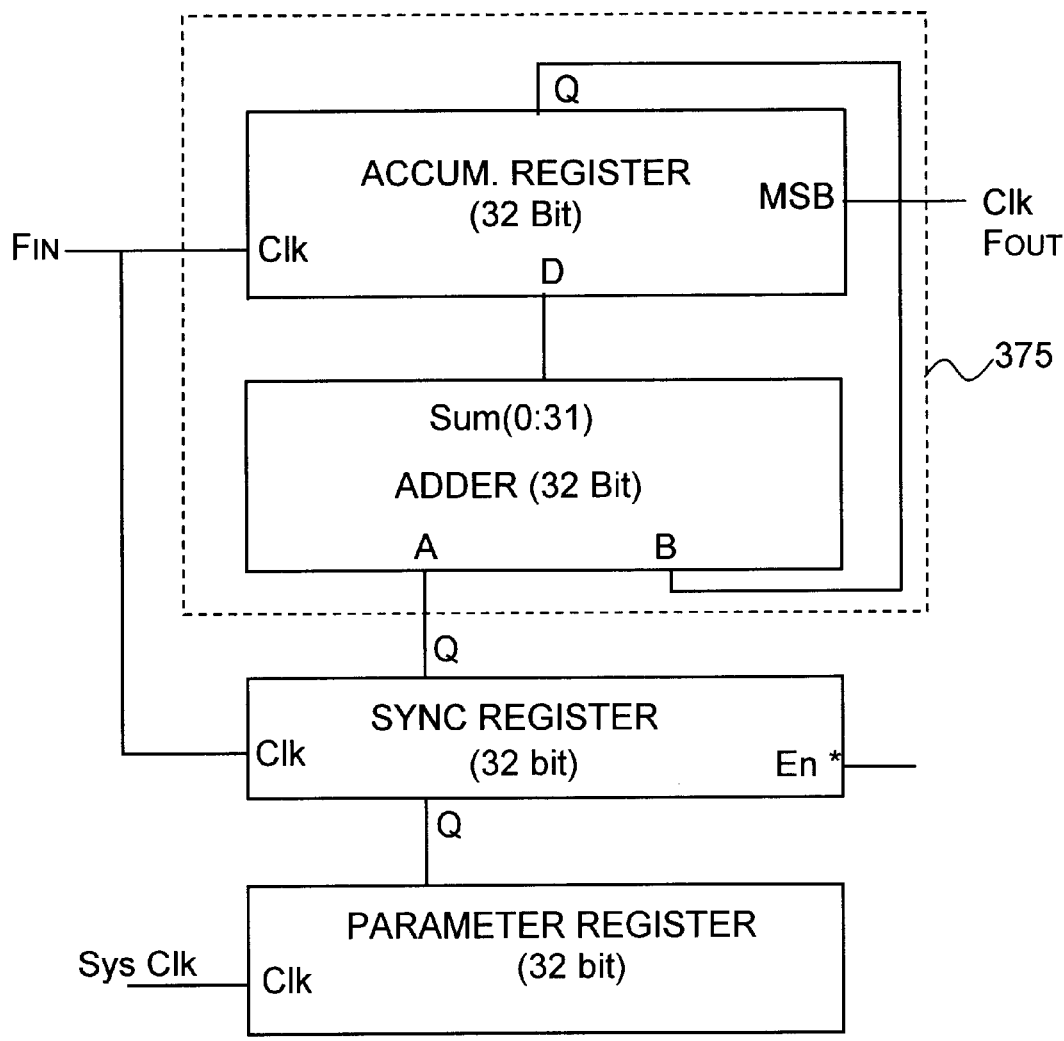
FIG. 3B illustrates a high-resolution clock generator in accordance with one embodiment of the invention.

FIG. 3B illustrates a high-resolution clock generator in accordance with one embodiment of the invention. Clock generator 350 includes a 32-bit DDA 375, in addition to a 32-bit synchronization register and a 32-bit programmable parameter register coupled together as shown. In the illustrated embodiment, the parameter register operates asynchronously with respect to the remaining registers, and can be asynchronously programmed (via an on chip processor for example) to store a variety of parameter values to influence the operation of clock generator 350. For example, a small value stored within the parameter register will cause $F_{OUT}$ to be a small percentage of $F_{IN}$, whereas a large value stored within the parameter register will cause $F_{OUT}$ to be a large percentage of $F_{IN}$. In one embodiment, the values that may be stored in the parameter register range from $2-2^{31}$. In one embodiment, the parameter register is preloaded with a default value of 32,985,348 (0x1F75104), which results in an output frequency of 1.536 MHz when $F_{IN}$ is 200 MHz. The synchronization register is provided to synchronize transition of the parameter value from the parameter register operating based on the system clock, to DDA 375 operating based upon the input clock ($F_{IN}$).

Figure 4A:
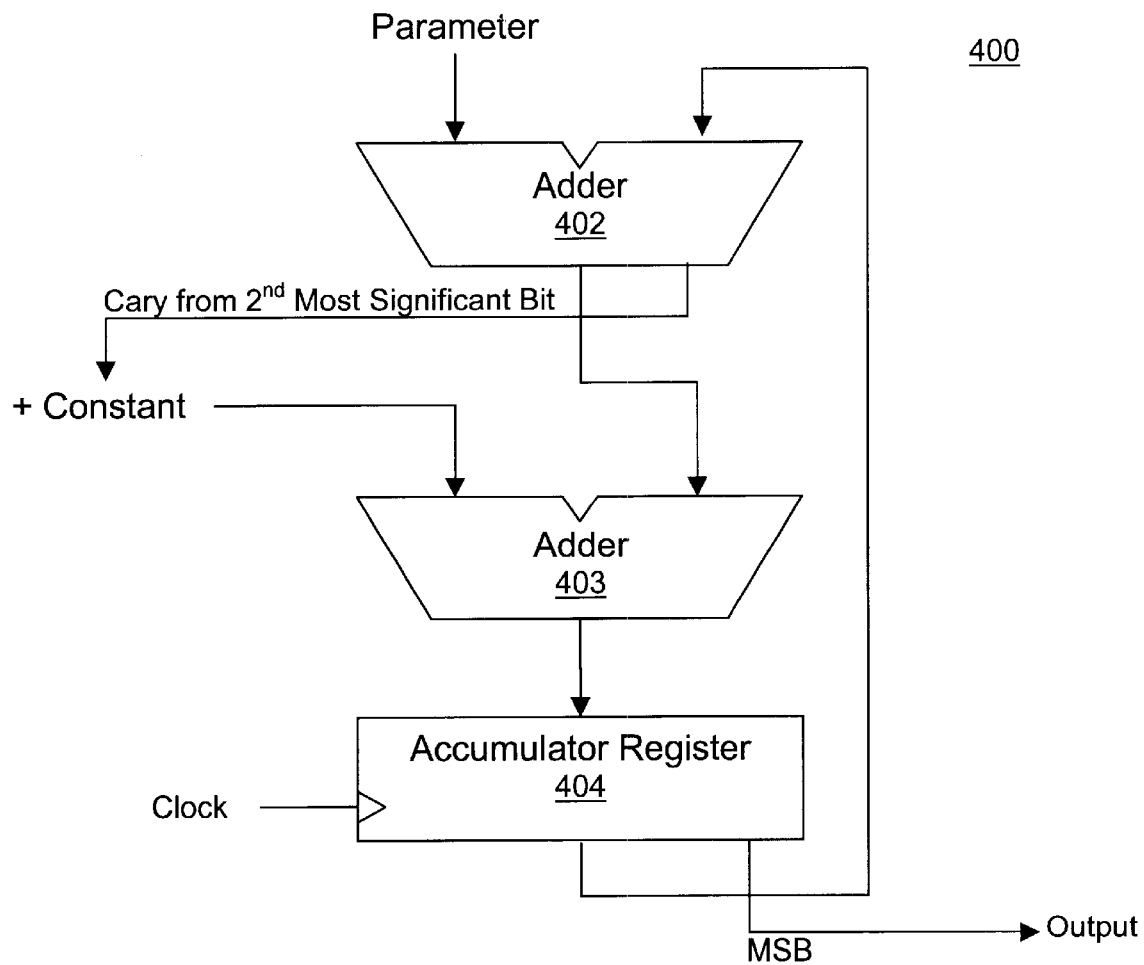
FIG. 4A illustrates a rate multiplier based upon a modified DDA, in accordance with one embodiment of the invention.

FIG. 4A illustrates a rate multiplier based upon a modified DDA, in accordance with one embodiment of the invention. DDA 400 is configured in a manner similar to that of DDA 300 having both a first adder (402) and an accumulator register (404). However, DDA 400 further includes secondary adder 403 coupled between adder 402 and accumulator register 404 as shown. Depending upon how adder 403 is coupled to accumulator register 404, adder 403 can be configured to add a variety of constant values into accumulator register 404 at various times. In one embodiment, adder 403 is driven based upon a carry out from the second most significant bit of first adder 402. Furthermore, depending upon what value(s) are added into accumulator register 404 by adder 403, it is possible to cause accumulator register 404 to toggle its most significant bit at some point earlier than would have otherwise occurred. This can have the same effect as reducing the size of accumulator register 404, thereby enabling one to dynamically adjust the modulus of the divider ratio provided by DDA 300. More specifically, in accordance with the teachings of the present invention, the modulus can be adjusted to represent a non-binary number (i.e. cannot be represented as $2^N$, where N is a whole number). Depending upon how the modulus is selected, it is possible to obtain clocks with frequencies of a large number of different clock divide ratios that result in integer values, and thus maintain a constant clock period. In one embodiment, 240 is chosen as the modulus for the DDA.

Figure 4B:
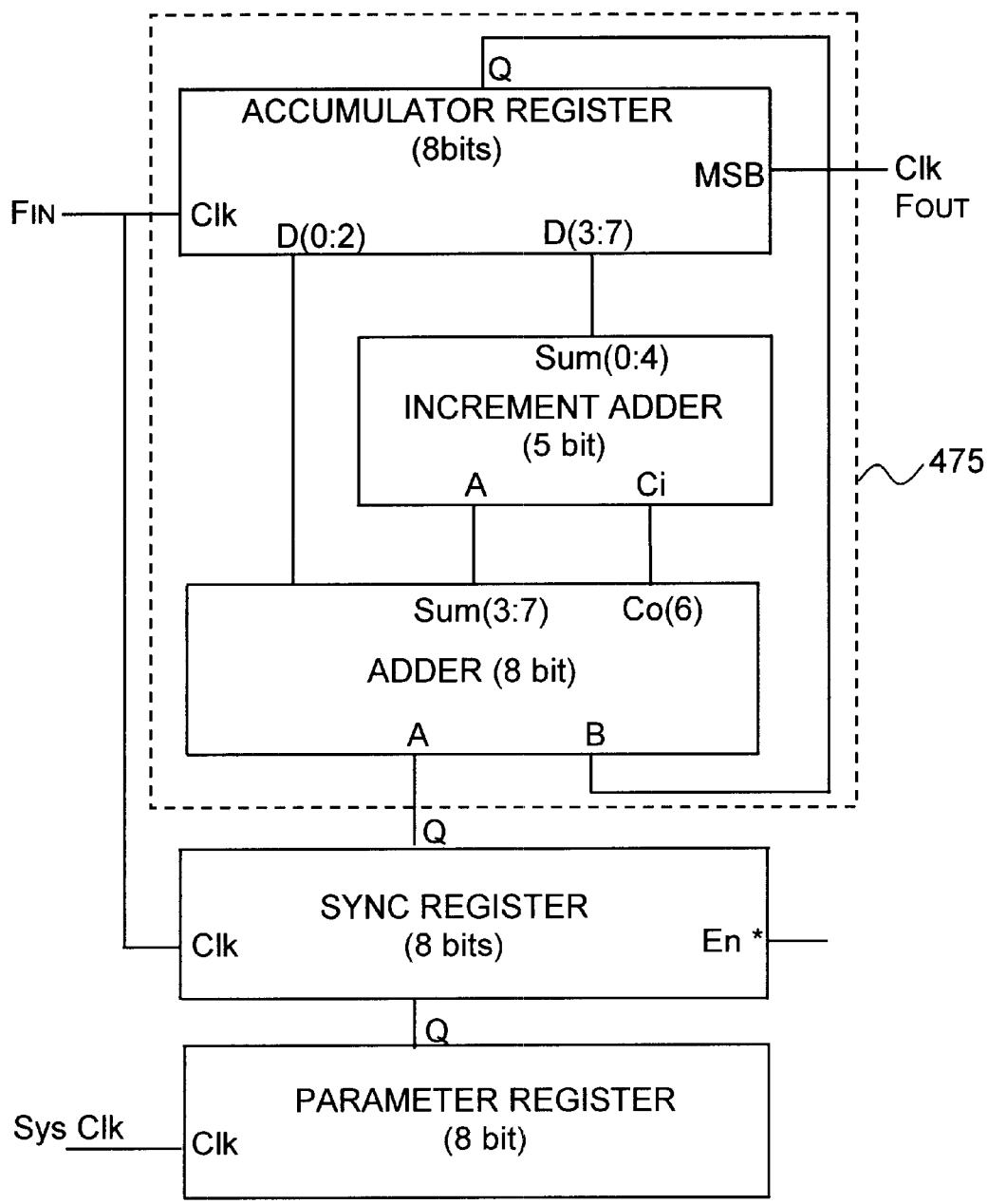
FIG. 4B illustrates an example system clock generator utilizing a modulo 240 DDA, in accordance with one embodiment of the invention.

FIG. 4B illustrates an example system clock generator utilizing a modulo 240 DDA for frequency rate multiplication, in accordance with one embodiment of the invention. System clock generator 450 includes a parameter register coupled to a synchronization register, which in turn, is coupled to modified DDA 475 as shown. Modified DDA 475 includes an 8-bit first adder, a 5-bit increment adder, and an 8-bit accumulator register into which a programmable parameter value is repeatedly added. In one embodiment, to adjust the modulus of the binary native 256 of modified DDA 475 to a modulus of 240 (as described above), the 5-bit increment adder increments the accumulator value by 8 each time a carry is produced into the most significant bit of the 8-bit adder (i.e. a carry-out from bit 6). Because bit 0 of the increment adder is connected to bit 3 of the accumulator, an increment of 1 by the increment adder causes a corresponding increment of 8 in the accumulator. This results in an addition of 16 into the accumulator register each output cycle, thereby reducing the modulus of modified DDA 475 from 256 to 240. Accordingly, the following clean, non-fractional clock divide ratios can be obtained while maintaining a constant jitter-free or near jitter free clock period: 2, 3, 4, 5, 6, 8, 10, 12, 15, 16, 20, 24, 30, 40, 48, 60, 80, 120 and 240. Thus, it can be seen that DDA 475 provides for frequency division by odd numbers in addition to the widely used even number frequency division.

In addition to frequency division by even and odd numbers, the novel DDA configuration shown in FIG. 4B further allows frequency division by fractional numbers such as 2.5. For example, if a parameter value of 96 is stored into the parameter register of system clock generator 450, the resulting output's frequency $F_{OUT}$ would be equal to $F_{IN}/2.5$. In one embodiment, a valid range for parameter values is 2–120. Although odd value and non-integer divide ratios may result in duty cycles of other than 50%, if desired, additional logic may be added to the clock generator output to adjust accordingly.

Figure 5A:
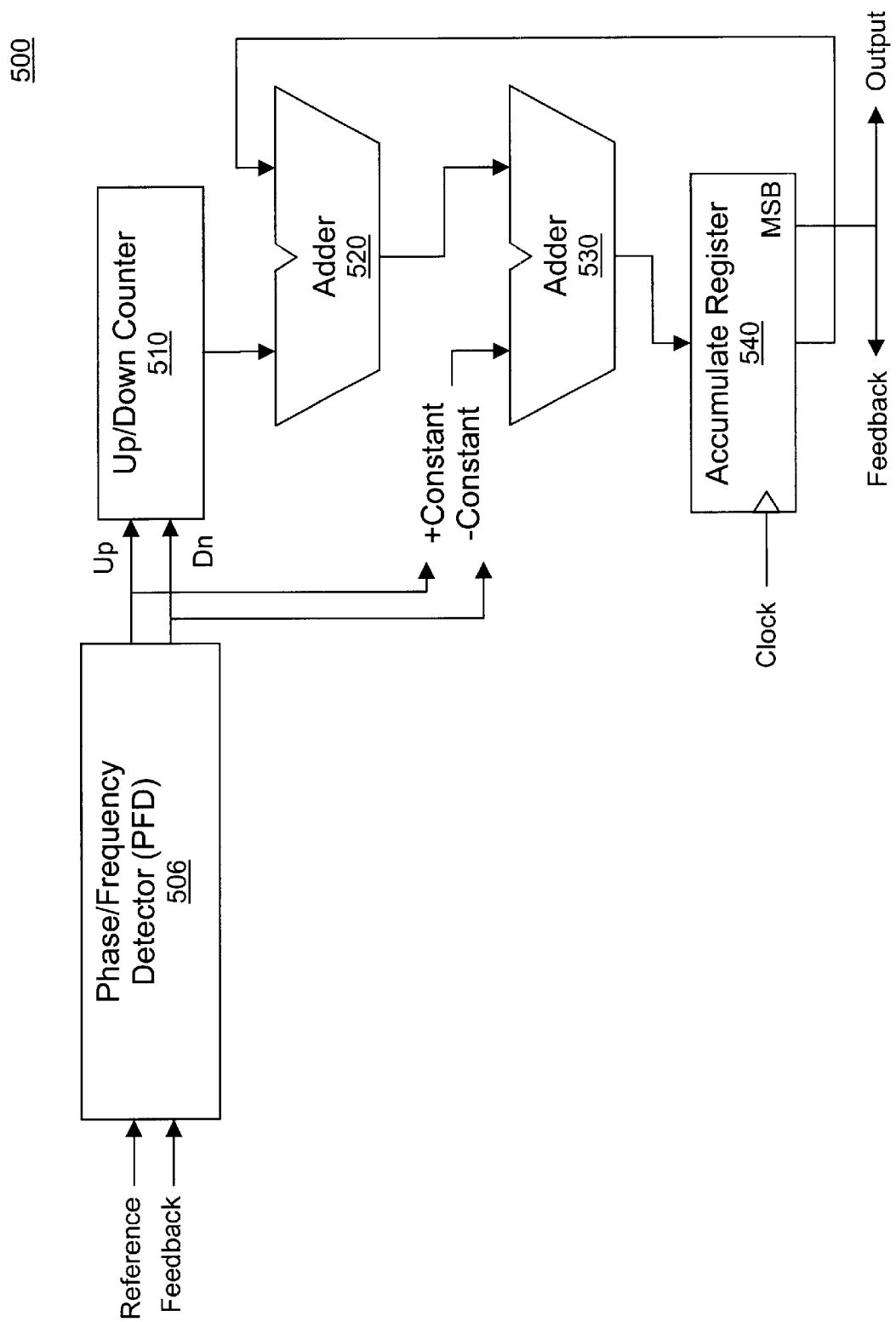
FIG. 5A is a block diagram illustrating a digital PLL utilizing a DDA rate multiplier in accordance with one embodiment of the invention.

FIG. 5A is a block diagram illustrating a digital PLL utilizing a DDA rate multiplier in accordance with one embodiment of the invention. Digital PLL 500 includes phase/frequency detector (PFD) 506, up/down counter 510, first adder 520, secondary adder 530 and accumulator register 540 coupled together as shown. As will be described in further detail below, PFD 506 generates an up/down signal that respectively operates to increment/decrement the value stored in up/down counter 510, thereby driving digital PLL 500 to a higher/lower frequency as determined e.g. by feedback into PFD 506. Additionally, the up/down signals inject a fixed additional increment/decrement into accumulator register 540 by way of adder 530, thereby increasing/decreasing the output frequency while either of the up/down signals are asserted. The combination of these two functions controlled by the up/down signals creates a second order loop filter for PLL 500.

Figure 5B:
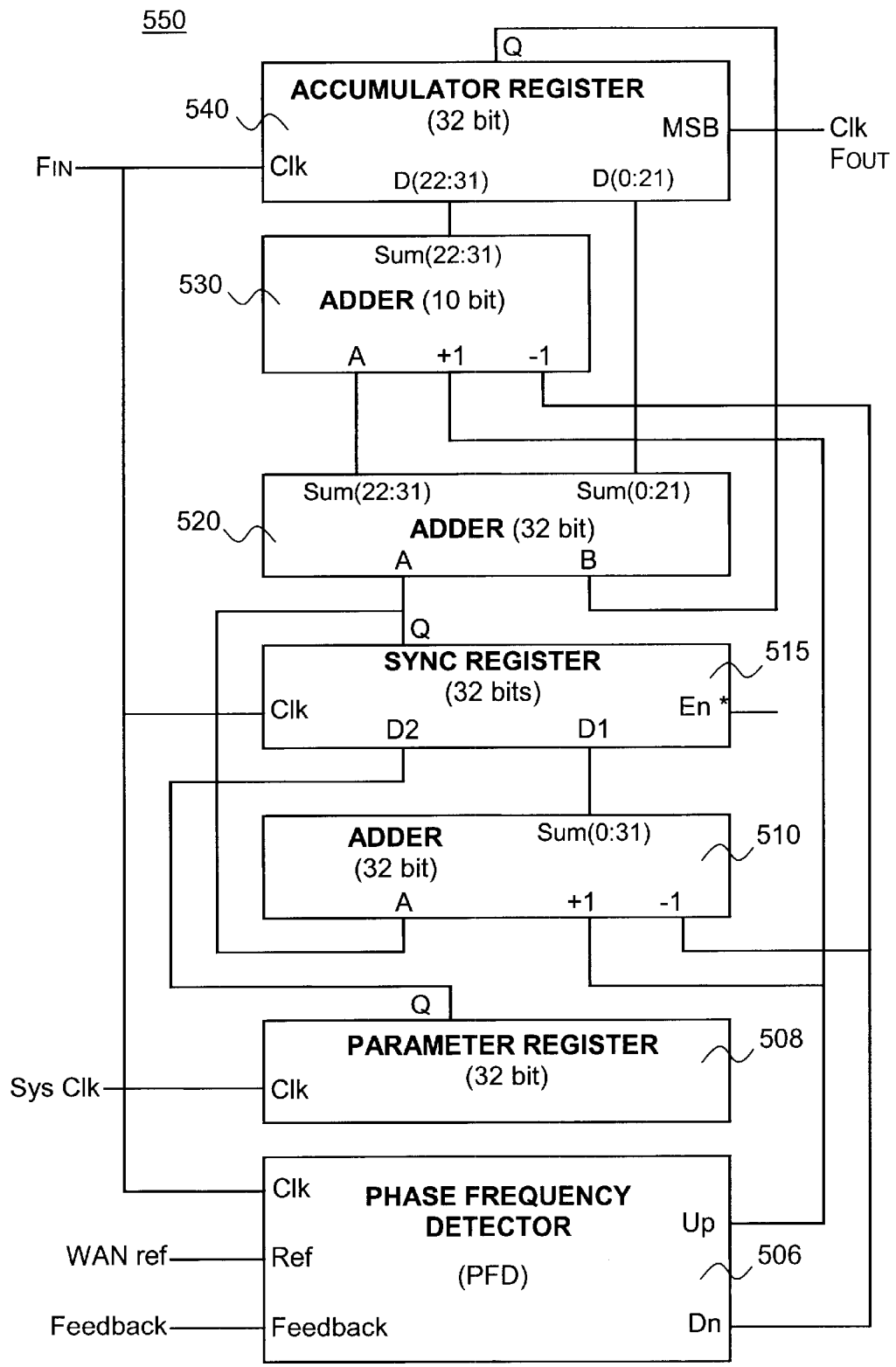
FIG. 5B illustrates a clock generator with PFD locking, in accordance with one embodiment of the invention.

FIG. 5B illustrates a clock generator with PFD locking, in accordance with one embodiment of the invention. Clock generator 550 includes PFD 506, parameter register 508, adder 510, sync register 515, adder 520, adder 530, and accumulator register 540 coupled together as shown. In accordance with one embodiment of the invention, clock generator 550 can be operated in one of at least two modes. In a first operational mode, clock generator 550 operates as a digital PLL and maintains an output frequency based upon a reference signal using feedback through PFD 506. In a second operational mode, PFD 506 is effectively disabled and clock generator 550 maintains an output with an output frequency based upon a value loaded into parameter register 508. The configuration and operation of clock generator 550 will now be explained.

Figure 6:
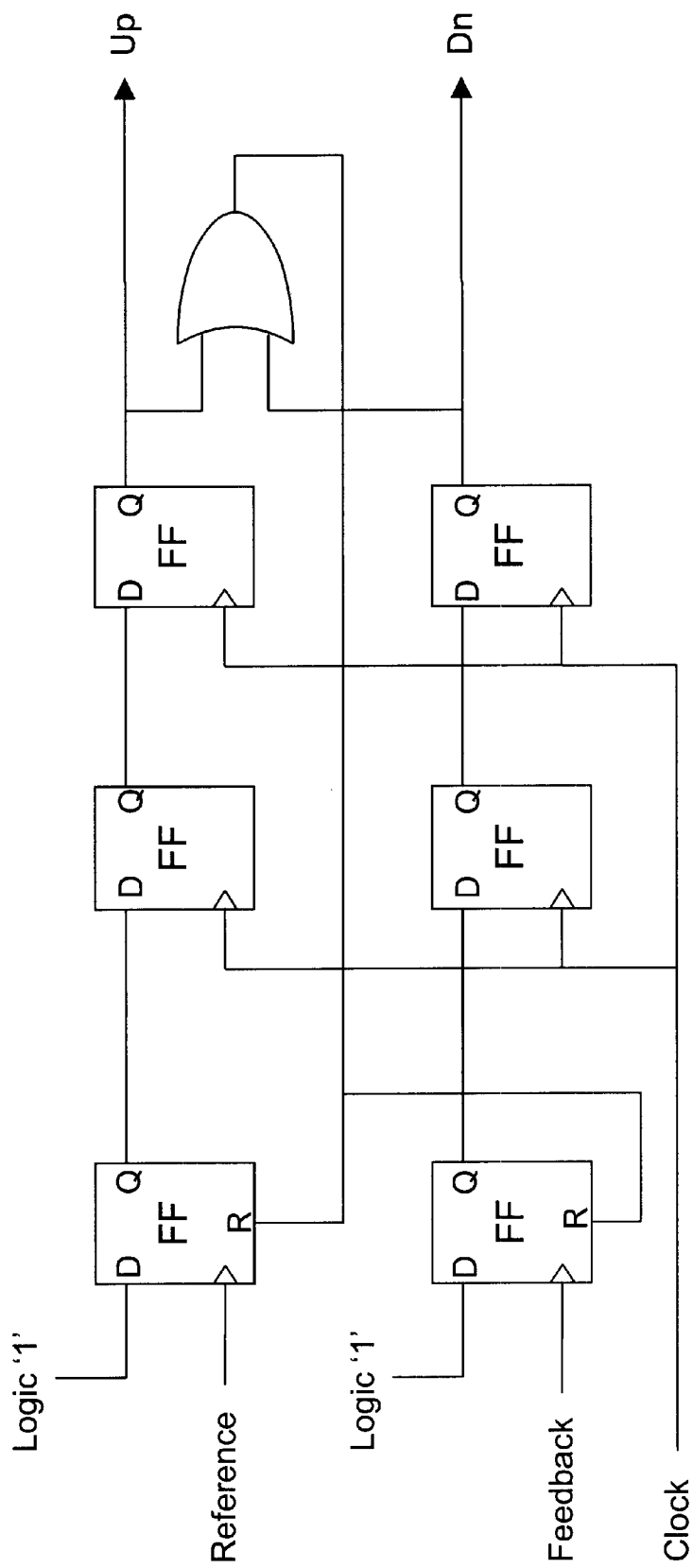
FIG. 6 illustrates a logic diagram of a phase/frequency detector, in accordance with one embodiment of the invention.

As will be shown in more detail in FIG. 6, PFD 506 includes a reference input signal, a feedback input signal, a clock input signal, and up and down output signals. The input reference signal can be obtained from a number of sources such as from a voice engine used to drive a T1 signal (e.g. 8 kHz), whereas the feedback is obtained from the MSB of accumulator register 540. In one embodiment, the feedback is obtained from logic dividing the signal from the MSB of accumulator register 540 by a factor of N selected to obtain the desired output frequency where $F_{OUT}=N*F_{REF}$. The up and down output signals of PFD are connected to adder 510 and adder 530. In the illustrated embodiment, adders 510 and 530 are incremental adders with the up/down signals of PFD 506 acting to increment/decrement the values stored in the respective registers.

Parameter register 508 can be used to store a default parameter value that is loaded into sync register 515 at startup. This can potentially reduce the amount of time it takes for clock generator 550 to reach a steady state. Additionally, parameter register 508 can be controlled by e.g. a processor of a first time domain and yet synchronously transfer its value to sync register 515 operating in a second time domain asynchronous to the first. Accordingly, a processor within a given subsystem can programmatically load values into parameter register 508 based upon demands of the subsystem. Furthermore, as will be explained below, parameter register 508 can act as a limiting value for the output frequency. In one embodiment, the MSB of the parameter register is connected to PFD 506 to indicate which operational mode PFD 506 should operate in.

In the first mode of operation (i.e. where clock generator 550 functions as a digital PLL), sync register 515 selectively receives data from either parameter register 508 or adder 510, and passes data to adder 520 as well as feeding its output back into adder 510. In one embodiment, EN is connected to a comparator (not shown) that compares the value stored in parameter register 508 with the value stored in sync register 515. So long as the value stored in sync register 515 is less than the value stored in parameter register 508, EN will select D1. As soon as the value stored in sync register 515 equals the value stored in parameter register 508 (e.g. due to adder 510), EN selects D2 effectively limiting the output frequency. In the second mode of operation, sync register 515 always receives input from parameter register 508.

Adder 520 adds the output of accumulator register 540 to the value stored in sync register 515 and stores the first 22 bits of data directly back into accumulator register 540. Bits 22–31 are stored back into accumulator register 540 after passing through adder 530, where they may be incremented/decremented depending upon the state of PFD 506. For example, if clock generator 550 is operating in the first mode as a digital PLL, adder 530 increments the value from adder 520 when the two inputs of PFD 506 (Reference & Feedback) are out of phase. In the illustrated embodiment, the value that adder 530 adds into accumulator register 540, directly determines how well damped, or not damped the system is.

Thus, as was described above, in a first operational mode, clock generator 550 maintains an output with an output frequency based upon a reference signal using feedback through PFD 506, whereas in a second operational mode, PFD 506 is effectively disabled and clock generator 550 maintains an output with an output frequency based upon a value loaded into parameter register 508. Accordingly, if clock generator 550 were to be used in a system (e.g. subsystem 102a–102d of FIG. 1) that happened to have an available reference signal, clock generator 550 could be operated in the first feedback mode. Moreover, if clock generator 550 were to be used in a system without a reference signal, or if the output frequency of clock generator 550 needed to be programmatically changed, clock generator 550 could be operated in the second mode.

FIG. 6 illustrates a logic diagram of a phase/frequency detector, in accordance with one embodiment of the invention. PFD 606 includes a first set of three cascaded D flip-flops to generate and up signal, and a second set of three cascaded D flip-flops to generate a "down" signal coupled together as shown. The input pins of both sets of flip-flops are tied to a high logic state, while a reference signal is used as the clock for the "up" set of flip-flops, and feedback from the output of digital PLL 500 is used for the clock of the down set of flip-flops. The output of each set of flip-flops is fed back through an OR gate to a reset pin in the first flip-flop of each set. Accordingly, due to the nature of PFD 606, neither the "up" or "down" signals will be active when the two inputs (Reference and Feedback) are within one clock period of one another (e.g. 200 ns for a 5 MHz clock).

Figure 7:
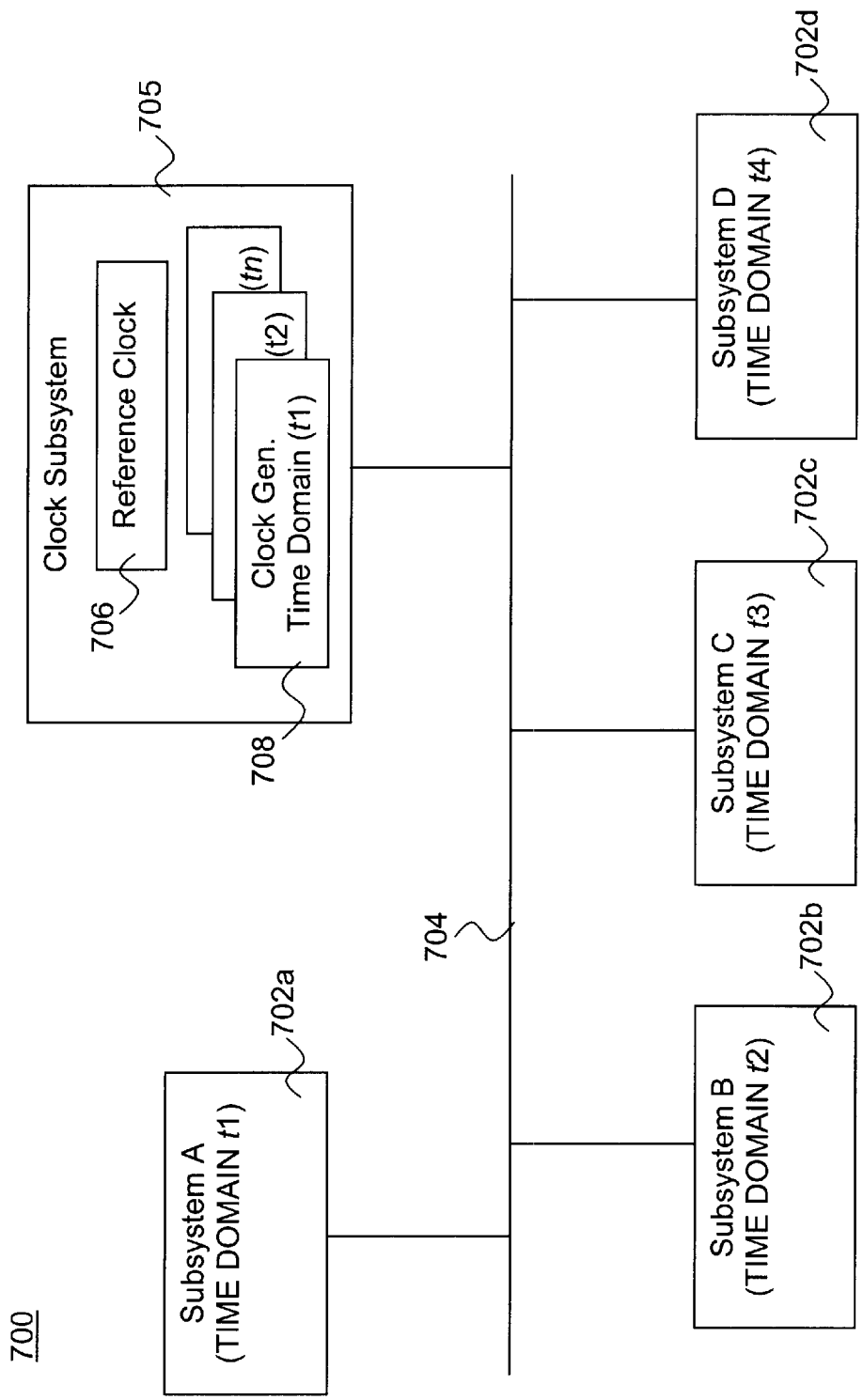
FIG. 7 illustrates an alternative embodiment of SOC 100 of FIG. 1 incorporating the teachings of the present invention.

FIG. 7 illustrates an alternative embodiment of SOC 100 of FIG. 1 incorporating the teachings of the present invention. As illustrated, SOC 700 includes on-chip bus 704, subsystems 702a–702d, and clock subsystem 705 coupled to each other through bus 704. In the illustrated embodiment, clock subsystem 705 includes reference clock 706 and clock generation logic 708 incorporating the teachings of the present invention. In accordance with the teachings of the present invention, clock subsystem 705 is advantageously equipped with clock generation logic 708 to generate a wide range of clock frequencies on behalf of subsystems 702a–702d. In one embodiment, clock generation logic 708 of clock subsystem 705 is beneficially provided with the adaptive and a locking frequency control mechanism of FIG. 5B to generate a wide range of programmable clock frequencies to facilitate flexible, high resolution rate matching between subsystems 702a–702d of SOC 700.

CONCLUSION AND EPILOGUE

Thus, it can be seen from the above descriptions, a clock generation apparatus for generating clock signals of having programmable frequencies for use by one or more subsystems of a SOC has been described. While the present invention has been described in terms of the foregoing embodiments, those skilled in the art will recognize that the invention is not limited to these embodiments. The present invention may be practiced with modification and alteration within the spirit and scope of the appended claims. Thus, the description is to be regarded as illustrative instead of restrictive on the present invention.

What is claimed is:

1. The frequency rate multiplier to produce an output with an output frequency as a ratio of an input frequency, the frequency rate multiplier comprising:

an accumulator register to store, based upon a first clock signal at said input frequency, a binary representation of the ratio having a first most significant bit and a second most significant bit, wherein the first most significant bit is outputted as the output of the frequency rate multiplier;

a first adder coupled to the accumulator register in a feedback arrangement to receive the binary representation stored in the accumulator register and, based upon the first clock signal, to repeatedly add said accumulator value to a programmable parameter value representing a component of the output frequency to obtain a first and a secondary adder coupled between the first adder and the accumulator register to receive the first result and, based upon the second most significant bit, to add a constant value to the first result forming a second result to be stored into the accumulator register, wherein the secondary adder is an increment adder.

2. The frequency rate multiplier of 1, wherein the secondary adder is a 5-bit adder and the accumulator register is an 8-bit register.

3. The frequency rate multiplier of claim 2, wherein bits 0–5 of the secondary adder are coupled to bits 3–7 of the accumulator register, respectively.

4. The frequency rate multiplier of claim 3, wherein the first adder is an 8-bit adder and bits 0–2 of the first adder are coupled to bits 0–2 of the accumulator register, and bits 3–7 of the first adder are coupled to bits 0–4 of the secondary adder, respectively.

5. The frequency rate multiplier of claim 1, wherein the secondary adder is a 10-bit adder and the accumulator register is a 32-bit register.

6. The frequency rate multiplier of claim 1, wherein the input frequency is in the range of 300 MHz to 400 MHz.

7. A frequency rate multiplier to produce an output with an output frequency as a ratio of an input frequency, the frequency rate multiplier comprising:

an accumulator register to store, based upon a first clock signal at said input frequency, a binary representation of the ratio having a first most significant bit and a second most significant bit, wherein the first most significant bit is outputted as the output of the frequency rate multiplier;

a first adder coupled to the accumulator register in a feedback arrangement to receive the binary representation stored in the accumulator register and, based upon the first clock signal, to repeatedly add said accumulator value to a programmable parameter value representing a component of the output frequency to obtain a first result;

a secondary adder coupled between the first adder and the accumulator register to receive the first result and, based upon the second most significant bit, to add a constant value to the first result forming a second result to be stored into the accumulator register; and a synchronizing register coupled to the first adder and a parameter register coupled to the synchronizing register, wherein the synchronizing register operates at said input frequency and said parameter register operates at a system clock frequency.

8. A clock generator to generate an output clock signal having a first frequency based upon an input clock signal having a second frequency, the clock generator comprising:

an accumulator register to store, based upon the input clock signal, a binary representation having a least significant bit and a most significant bit, wherein the most significant bit is successively outputted to form the output clock signal;

a phase/frequency detector (PFD) to operate at said second frequency to receive a reference signal having a third frequency and a feedback signal having a fourth frequency, and to generate an increment signal if the third frequency is higher than the fourth frequency, and to generate a decrement signal if the fourth frequency is higher than the third frequency;

a counter coupled to the PFD to increment/decrement a parameter value representing a component of said output clock signal based upon the increment or decrement signal from the PFD;

a first adder coupled to the counter and the accumulator register to add the incremented/decremented parameter value to the binary representation of the accumulator register forming an intermediate output; and a second adder coupled to the PED and disposed between the first adder and the accumulator register to add/subtract a constant value to/from the intermediate output based upon the increment or decrement signal from the PFD, and store the add/subtract result into the accumulator register.

9. The clock generator of claim 8, wherein the second adder is an increment adder.

10. The clock generator of claim 9, wherein the second adder is a 10-bit adder and the accumulator register is a 32-bit register.

11. The clock generator of claim 10, wherein bits 0–9 of the second adder are coupled to bits 22–31 of the accumulator register, respectively.

12. The clock generator of claim 11, wherein the first adder is an 32-bit adder and bits 0–21 of the first adder are coupled to bits 0–21 of the accumulator register, and bits 22–31 of the first adder are coupled to bits 0–9 of the secondary adder, respectively.

13. The clock generator of claim 10, wherein the second frequency is in the range of 300 MHz to 400 MHz.

14. The clock generator of claim 10, further comprising:
a synchronizing register coupled to the first adder to store a first value;
a parameter register coupled to the synchronizing register to store a second value;
a comparator coupled to both the synchronizing register and the parameter register to compare the first value with the second value, wherein if the first value is less than the second value, then the synchronizing register receives data from the counter, and if the first value is equal to or greater than the second value, the synchronizing register receives data from the parameter register to limit the first frequency of the output clock.

15. An integrated circuit comprising:
a clock generator to generate an output clock signal having a first frequency based upon an input clock signal having a second frequency, the clock generator comprising:
an accumulator register to store, based upon the input clock signal, a binary representation having a least significant bit and a most significant bit, wherein the most significant bit is successively outputted to form the output clock signal;
a phase/frequency detector (PFD) to operate at said second frequency to receive a reference signal having a third frequency and a feedback signal having a fourth frequency, and to generate an increment signal if the third frequency is higher than the fourth frequency, and to generate a decrement signal if the fourth frequency is higher than the third frequency;
a counter coupled to the PFD to increment/decrement a parameter value representing a component of said output clock signal based upon the increment or decrement signal from the PFD;
a first adder coupled to the counter and the accumulator register to add the incremented/decremented parameter value to the binary representation of the accumulator register forming an intermediate output; and
a second adder coupled to the PFD and disposed between the first adder and the accumulator register to add/subtract a constant value to/from the intermediate output based upon the increment or decrement signal from the PFD, and store the add/subtract result into the accumulator register.

16. The integrated circuit of claim 15, wherein the second adder is an increment adder.

17. The integrated circuit of claim 16, wherein the second adder is a 10-bit adder and the accumulator register is a 32-bit register.

18. The integrated circuit of claim 17, wherein bits 0–9 of the second adder are coupled to bits 0–9 the accumulator register, respectively.

19. The integrated circuit of claim 15, wherein the first adder is an 32-bit adder and bits 0–21 of the first adder are coupled to bits 0–21 of the accumulator register, and bits 22–31 of the first adder are coupled to bits 0–9 of the secondary adder, respectively.

20. The integrated circuit of claim 15, wherein the second frequency is in the range of 300 MHz to 400 MHz.

21. The integrated circuit of claim 15, further comprising:
a synchronizing register coupled to the first adder to store a first value;
a parameter register coupled to the synchronizing register to store a second value;
a comparator coupled to both the synchronizing register and the parameter register to compare the first value with the second value, wherein if the first value is less than the second value then the synchronizing register receives data from the counter, and if the first value is equal to or greater than the second value, the synchronizing register receives data from the parameter register to limit the first frequency of the output clock.

22. An integrated circuit comprising:
on-chip buss;
a master clock signal having a first frequency coupled to said on-chip buss a subsystem coupled to said bus and including core logic and a clock generator, said clock generator to generate an operational clock signal having an output frequency for use by said core logic based upon an input frequency of an input clock signal selected from one of said master clock signal and a reference signal provided by said core logic, said clock generator including
an accumulator register to store, based upon the input clock signal, a binary representation having a least significant bit and a most significant bit, wherein the most significant bit is successively outputted to form the output clock signal;
a phase/frequency detector (PFD) to operate at said input frequency to receive a reference signal having a reference frequency and a feedback signal having a feedback frequency, and to generate an increment signal if the reference frequency is higher than the feedback frequency, and to generate a decrement signal if the feedback frequency is higher than the reference frequency;
a counter coupled to the PFD to increment/decrement a parameter value representing a component of said output clock signal based upon the increment or decrement signal from the PED;
a first adder coupled to the counter and the accumulator register to add the incremented/decremented parameter value to the binary representation of the accumulator register forming an intermediate output; and
a second adder coupled to the PFD and disposed between the first adder and the accumulator register to add/ subtract a constant value to/from the intermediate output based upon the increment or decrement signal from the PFD, and store the add/subtract result into the accumulator register.

23. The integrated circuit of claim 22, wherein the second adder is an increment adder.

24. The integrated circuit of claim 23, wherein the second adder is a 10-bit adder and the accumulator register is a 32-bit register.

25. The integrated circuit of claim 24, wherein bits 0–9 of the second adder are coupled to bits 0–9 of the accumulator register, respectively.

26. The integrated circuit of claim 25, wherein the first adder is an 32-bit adder and bits 0–21 of the first adder are coupled to bits 0–21 of the accumulator register, and bits 22–31 of the first adder are coupled to bits 0–9 of the secondary adder, respectively.

27. The integrated circuit of claim 22 wherein the input frequency is in the range of 300 MHz to 400 MHz.

28. The integrated circuit of claim 22, further comprising:
a synchronizing register coupled to the first adder to store a first value;
a parameter register coupled to the synchronizing register to store a second value; and
a comparator coupled to both the synchronizing register and the parameter register to compare the first value with the second value, wherein if the first value is less than the second value then the synchronizing register receives data from the counter, and if the first value is equal to or greater than the second value, the synchronizing register receives data from the parameter register to limit the output frequency.

29. An integrated circuit comprising:
an on chip bus;
a first subsystem coupled to the on-chip bus and designed to operate based upon a first clock signal of a first frequency;
a second subsystem coupled to the on-chip bus and designed to operate based upon a second clock signal of a second frequency;
a third subsystem coupled to the on-chip bus and designed to operate based upon a third clock signal of a third frequency;
a clock subsystem coupled to the on-chip bus to generate an output clock signal having an output frequency matching at least one of said first, second and third frequencies based upon an input clock signal having an input frequency, said clock subsystem including
an accumulator register to store, based upon the input clock signal, a binary representation having a least significant bit and a most significant bit, wherein the most significant bit is successively outputted to form the output clock signal;

a phase/frequency detector (PED) to operate at said input frequency to receive a reference signal having a reference frequency and a feedback signal having a feedback frequency, and to generate an increment signal if the reference frequency is higher than the feedback frequency, and to generate a decrement signal if the feedback frequency is higher than the reference frequency;
a counter coupled to the PFD to increment/decrement a parameter value representing a component of said output clock signal based upon the increment or decrement signal from the PFD;
a first adder coupled to the counter and the accumulator register to add the incremented/decremented parameter value to the binary representation of the accumulator register forming an intermediate output; and
a second adder coupled to the PFD and disposed between the first adder and the accumulator register to add/subtract a constant value to/from the intermediate output based upon the increment or decrement signal from the PFD, and store the add/subtract result into the accumulator register.

30. The integrated circuit of claim 29, wherein the second adder is an increment adder.

31. The integrated circuit of claim 30, wherein the second adder is a 10-bit adder and the accumulator register is a 32-bit register.

32. The integrated circuit of claim 31, wherein bits 0–9 of the second adder are coupled to bits 0–9 of the accumulator register, respectively.

33. The integrated circuit of claim 32, wherein the first adder is an 32-bit adder and bits 0–21 of the first adder are coupled to bits 0–21 of the accumulator register, and bits 22–31 of the first adder are coupled to bits 0–9 of the secondary adder, respectively.

34. The integrated circuit of claim 29, wherein the input frequency is in the range of 300 MHz to 400 MHz.

35. The integrated circuit of claim 29, further comprising:
a synchronizing register coupled to the first adder to store a first value;
a parameter register coupled to the synchronizing register to store a second value and
a comparator coupled to both the synchronizing register and the parameter register to compare the first value with the second value, wherein the synchronizing register receives data from the counter if the first value is less than the second value, and the synchronizing register receives data from the parameter register if the first value is equal to or greater than the second value so as to limit the output frequency.

* * * * *